US006738078B1

(12) United States Patent
Duncombe

(10) Patent No.: US 6,738,078 B1
(45) Date of Patent: *May 18, 2004

(54) MEDIA SYSTEM FOR THE SELECTIVE PLAYING OF MEDIA CLIPS BASED UPON USER FEEDBACK

(75) Inventor: Jefferson D. Duncombe, Lake Forest, CA (US)

(73) Assignee: D4 Media, Inc., Lake Forest, CA (US)

( * ) Notice: Subject to any disclaimer, the term of this patent is extended or adjusted under 35 U.S.C. 154(b) by 645 days.

This patent is subject to a terminal disclaimer.

(21) Appl. No.: 09/609,476

(22) Filed: Jun. 30, 2000

Related U.S. Application Data

(63) Continuation-in-part of application No. 09/562,244, filed on Apr. 28, 2000, now Pat. No. 6,430,582, and a continuation-in-part of application No. 09/570,326, filed on May 12, 2000.

(51) Int. Cl.[7] .............................................. G06F 15/00
(52) U.S. Cl. ..................................... 345/761; 707/500.1
(58) Field of Search ................................. 345/761, 762, 345/763, 716, 723; 707/500.1, 501.1

(56) References Cited

U.S. PATENT DOCUMENTS

| 5,101,364 A | 3/1992 | Davenport et al. |
| 5,267,351 A | 11/1993 | Reber et al. |
| 5,339,423 A | 8/1994 | Beitel et al. |
| 5,355,450 A | 10/1994 | Garmon et al. |
| 5,584,006 A | 12/1996 | Reber et al. |
| 5,678,012 A | 10/1997 | Kimmich et al. |
| 5,740,388 A | 4/1998 | Hunt |
| 5,828,371 A | 10/1998 | Cline et al. |
| 5,852,435 A | 12/1998 | Vigneaux et al. |
| 5,903,892 A | 5/1999 | Hoffert et al. |
| 5,956,716 A | 9/1999 | Kenner et al. |
| 5,956,729 A | 9/1999 | Goetz et al. |
| 5,983,176 A | 11/1999 | Hoffert et al. |
| 6,012,068 A | 1/2000 | Boezeman et al. |
| 6,356,921 B1 * | 3/2002 | Kumar et al. ................ 345/866 |
| 6,389,467 B1 * | 5/2002 | Eyal ............................ 709/223 |

OTHER PUBLICATIONS

Jensen–Link et al., Effective Video Capture Techniques for Educational Multimedia, pp. 3a2.30–3a2.33, vol. 1, Frontiers in Education Conference 11/95.
Dawood et al., MPEG Video Modeling Based on Scene Desription, Image Processing, pp 351–355, vol. 2 10/98.
Villareal et al., A Collaborative Multimedia, Web–based Electronics Course: Projection Description and Survey, pp. 39–43, vol. 1, Frontiers In Education Conference, 11/96.

* cited by examiner

Primary Examiner—Cao (Kevin) Nguyen
(74) Attorney, Agent, or Firm—Eric Karich

(57) ABSTRACT

A media system for the selective playing of media clips based upon feedback collected from a user includes a storage device electronically storing at least one media file and a media organization file. The media organization file includes at least two media selection parameters, each of the at least two media selection parameters having a number of media descriptions, and a database that associates each of a number of media clips with at least one of the media descriptions. The media system further includes an interface program for receiving at least two desired media descriptions from the user, a goal seeking engine for selecting a number of suitable media clips from the media clips based upon the at least two desired media descriptions, and a media player for playing the suitable media clips. Once the suitable media clips have been played, the media system uses a question program interface having a plurality of questions for accepting feedback from the user. The feedback is inputted into the goal seeking engine for reselecting the suitable media clips based upon the feedback of the user.

12 Claims, 14 Drawing Sheets

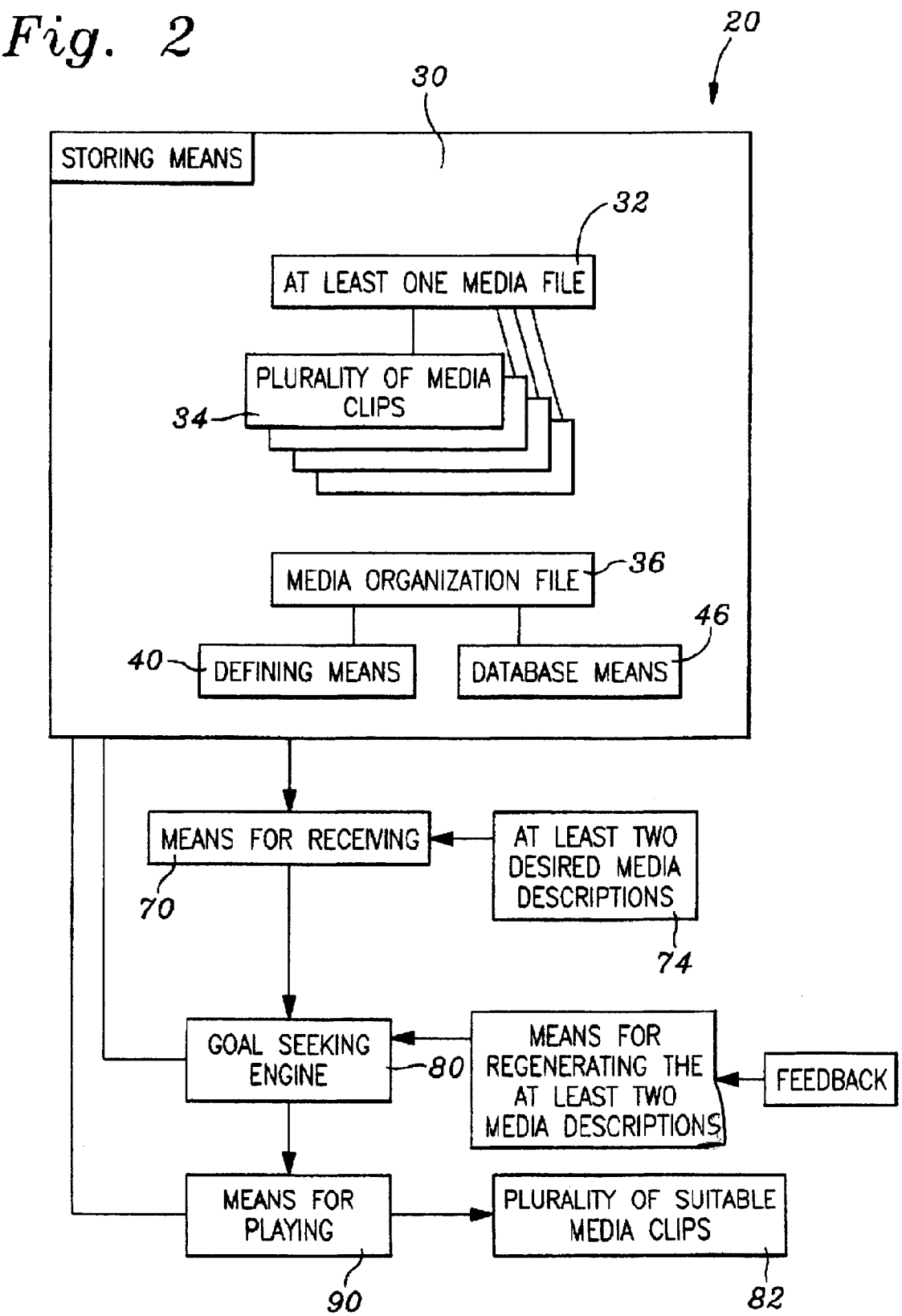

Fig. 3A

| CLIP # | FILE NAME |
|--------|-----------|
| 1 | ABE 1.AVI |
| 2 | ABE 2.AVI |
| 3 | ABE 3.AVI |
| 4 | ABE 4.AVI |

Fig. 3B

| CLIP # | FILE NAME | START POINT | RUN TIME |
|--------|-----------|-------------|----------|
| 1 | ABE.AVI | 0.00.00 | 30 S. |
| 2 | ABE.AVI | 0.00.30 | 1 MIN. 05 S. |
| 3 | ABE.AVI | 0.01.35 | 1 MIN. |
| 4 | ABE.AVI | 0.01.45 | 35 S. |

Fig. 4

| TOPIC PARAMETER | COMPLEXITY PARAMETER | ORDER PARAMETER | TIME PARAMETER |
|---|---|---|---|
| AT LEAST ONE TOPIC<br><br>EX.:<br>BIRTH TOPIC<br><br>EARLY CHILDHOOD TOPIC<br><br>EARLY PRESIDENCY TOPIC<br><br>CIVIL WAR TOPIC<br>SLAVERY TOPIC<br>DEATH TOPIC | AT LEAST ONE COMPLEXITY RATING<br><br>EX.:<br>1-10 | AT LEAST ONE ORDER RATING<br><br>EX.:<br>1-100 | LENGTH OF TIME<br><br>EX.:<br>0.00.00-<br>5.55.55 |

DEFINING MEANS:
MEDIA SELECTION PARAMETERS:
MEDIA DESCRIPTION

| DATABASE MEANS: | | | | | |
|---|---|---|---|---|---|
| CLIP # | TOPIC | COMPLEXITY | ORDER | TIME (MIN.) | QUESTION |
| 1 | BIRTH | 1 | 1 | 10 | 1 |
| 2 | BIRTH | 1 | 1 | 5 | 1 |
| 63 | DEATH | 1 | 89 | 2 | 70 |
| 64 | DEATH | 8 | 92 | 2 | 71 |
| N | − | − | − | − | − |

ABRAHAM LINCOLN

TOPICS      COMPLEXITY

◉ BIRTH     [ 2 ]   —124

○    ◉ 1637— FOREFATHER MOVES FROM ENGLAND
○    ◉ 1778— FATHER BORN IN VIRGINIA
○    ○ 1782— FAMILY MOVES TO KENTUCKY
○    ○ 1785— GRANDFATHER KILLED BY INDIANS
○    ○ 1806— LINCOLN'S SISTER BORN
○    ○ 1809— LINCOLN BORN IN LOG CABIN
      ○ 1812— LINCOLN'S BROTHER BORN
LEN               [APPLY]

[ADVANCED]             [GO!]

Fig. 6C

DEMOGRAPHICS    CITY [CORONA]
79—    AGE       STATE [CA]

○ UNDER 15     INTERRESTS     SPORTS-CATEGORIES  —124
◉ 15-25       ○ ENTERTAINMENT/ MOVIES    ○ SOCCER
○ 25-35       ○ BUSINESS           ◉ PAINTBALL
○ 36-59       ○ INTERNET           ○ BASKETBALL
○ 60+         ○ HOME & GARDEN      ○ TENIS
INCOME       ○ CHILDREN RELATED    ○ GOLF
○ UNDER 15    ○ HEALTH/ MEDICINE     ○ HOCKEY
◉ 15-25       ○ HOME & GARDEN      ○ TENIS
○ 25-35       ○ LAW                ○ SURFING
○ 36-59       ◉ SPORTS            ○ VOLLEY BALL
○ 60+         ○ FOOTBALL           ○ WRESTLING [OK]
○ 36-59       ○ BASEBALL      [GO!]
○ 60+

Fig. 9A

| CLIP # | QUESTION |
|---|---|
| 1 | WHEN WAS LINCOLN BORN? |
| 2 | " |
| 3 | WHERE WAS LINCOLN BORN? |
| 4 | " |
| 5 | " |
| 6 | WHAT WAS LINCOLN'S MOM'S NAME? |

Fig. 9B

| QUESTION | AT LEAST TWO DESIRED MEDIA DESCRIPTIONS |
|---|---|
| WHEN WAS LINCOLN BORN? | EARLY CHILDHOOD TOPIC, COMPLEXITY 1-5, TIME= 5 MINUTES |
| WHERE WAS LINCOLN BORN? | EARLY CHILDHOOD TOPIC, COMPLEXITY 6, TIME= 1 MINUTE |

*Fig. 9C*

| QUESTION | CLIPS |
|---|---|
| WHERE WAS LINCOLN BORN? | 1,2 |
| WHEN WAS LINCOLN BORN? | 3,4,5 |
| WHAT WAS LINCOLN'S MOM'S NAME? | 6 |

*Fig. 10*

| CLIP # | PLAYED? | SESSION INFO |
|---|---|---|
| 1 | N | |
| 2 | Y | ANSWERED Q INCORRECTLY |
| 3 | N | |
| 4 | Y | ANSWERED Q CORRECTLY |
| N | - | - |

MEDIA SYSTEM FOR THE SELECTIVE PLAYING OF MEDIA CLIPS BASED UPON USER FEEDBACK

CROSS-REFERENCE TO RELATED APPLICATIONS

This application for a utility patent is a continuation-in-part of the following previously filed utility patents: application Ser. No. 09/562,244, filed Apr. 28, 2000 now U.S. Pat. No. 6,430,582 and application Ser. No. 09/570,326, filed May 12, 2000.

STATEMENT REGARDING FEDERALLY SPONSORED RESEARCH

Not Applicable

BACKGROUND OF THE INVENTION

1. Field of the Invention

This invention relates generally to media systems, and more particularly to a media system that can be used to build custom media presentations from a plurality of media clips according to parameters specified by a user, the media system further having the capability of soliciting feedback from the user and making further media presentations based upon the feedback of the user.

2. Description of Related Art

The following art defines the present state of this field:

Sawyer, U.S. Pat. No. 4,717,971, discloses a method for establishing an electronic picture file composed of a plurality of individual pictures stored on several disks. The method uses an editing procedure that is controlled by a plurality of attributes selected by the user. First, the user assigns a category to each picture. The user then has the option of specifying picture order, time allotted for viewing each picture and text to accompany each picture. The system generates an electronic picture file that is organized according to these parameters.

Richards, U.S. Pat. No. 5,301,172, discloses a method of storing multimedia clips "user information items") broken by inserted "selection points." A reproducing apparatus then reproduces the multimedia clips and allows the user to direct the course of the multimedia presentation by his or her responses at the selection points. Each selection point is capable of directing the multimedia presentation to a plurality of different multimedia clips.

Beitel, U.S. Pat. No. 5,339,423, discloses a computer/software system which enables a user to produce and display an audio/visual application using a library of image, audio and story objects.

Drake, U.S. Pat. No. 5,550,966, discloses an automated presentation capture system that captures and stores audio/video/presentation inputs and stores them in a database.

Gustman, U.S. Pat. No. 5,832,495, discloses cataloging multimedia data by labeling the different "elements" or pieces of each stream of media (audio, video, etc.) and associating keywords with each element. This data can be organized in a database and searched for the purpose of locating a specific element of multimedia.

Beitel, U.S. Pat. No. 5,274,758, discloses a user/PC interface system which enables the creation and performance of a synchronized audio/visual story on the PC. The system plays an audio presentation; and the audio presentation includes "labels" that, when played, trigger the generation of video images. Since the video images are displayed when triggered by the "label", the entire presentation is synchronized.

Etra, U.S. Pat. No. 5,012,334, discloses a video image bank system for preparing an edit tape and associated edit list from a library of stock video image sequences.

Isadore-Barreca, U.S. Pat. No. 5,590,262. discloses an interactive video creation method for constructing an interactive video interface having a primary video layer, a library layer and a resource data base layer.

Ettlinger, U.S. Pat. No. 4,746,994, discloses a video-taped-based editing system that uses a plurality of video recorders and a computer-based operator's console to allow easier editing.

Pooser, U.S. Pat. No. 5,812,134, discloses a 3-D display of the contents of a database. The 3-D display provides a user with both the "position" and relationships of the information unit being examined relative to the remainder of the database, as well as the information regarding the overall size and complexity of the database.

Nunally, U.S. Pat. No. 5,974,235, discloses techniques for storing video in a database and analyzing the video image data in order to detect significant features of the images. This system is useful for analyzing the videos produced by surveillance cameras to detect intruders. The prior art teaches various search engines for ordering media files. However, the prior art does not teach a dynamic search engine that builds a custom media presentation according to parameters specified by the user. The prior art also does not teach a media system that solicits feedback from the user and modifies the media presentation in response to the feedback. The present invention fulfills these needs and provides further related advantages as described in the following summary.

SUMMARY OF THE INVENTION

The present invention teaches certain benefits in construction and use which give rise to the objectives described below.

The present invention provides a media system for the selective playing of a plurality of suitable media clips that are selected from a plurality of media clips based upon feedback collected from a user. The media system includes a means for storing at least one media file and a media organization file. The media organization file includes at least two media selection parameters, each of the at least two media selection parameters having a plurality of media descriptions, and a database that associates each of the plurality of media clips with at least one of the plurality of media descriptions. The media system further includes a means for receiving at least two desired media descriptions from the user, a means for selecting a plurality of suitable media clips from the plurality of media clips based upon the at least two desired media descriptions, and a means for playing the plurality of suitable media clips. Once the plurality of suitable media clips have been played, the media system uses a means for soliciting feedback and a means for accepting feedback from the user, and a means for reselecting the plurality of suitable media clips based upon the feedback of the user.

A primary objective of the present invention is to provide a media system having advantages not taught by the prior art.

Another objective is to provide a media system that allows a professional to organize and classify material so that a user can utilize a goal seeking search engine to create custom media presentations that meet the requirements of the user.

A further objective is to provide a media system that solicits feedback from the user and modifies the media presentation in response to the feedback.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a block diagram thereof;

FIG. 3A is a table illustrating how each of a plurality of media clips is provided by one of a plurality of media files;

FIG. 3B is a table that functions to define the plurality of media clips from within one media file;

FIG. 4 is a table illustrating a defining means of a media organization file, the defining means including a plurality of media selection parameters, each of the plurality of media selection parameters having a plurality of media descriptions;

FIG. 6B is another computer monitor screen upon which is displayed the interface program showing the use of an advanced control box to allow the user more detailed control over the media system;

FIG. 6C is another computer monitor screen upon which is displayed a second embodiment of the means for receiving a plurality of desired media descriptions, the means for receiving being an interface program generated by the personal computer to receive a plurality of desired user demographics;

FIG. 9A is a table illustrating how the database means is used to reference each of the plurality of media clips to at least one of a plurality of questions;

FIG. 9B is a table illustrating a first embodiment of a means for re-selecting the plurality of suitable media clips in which the database means is used to reference each of the plurality of questions to at least two desired media descriptions;

FIG. 9C is a table illustrating a second embodiment thereof, wherein the database means is used to reference each of the plurality of questions directly with at least one of the plurality of media clips;

FIG. 10 is a table illustrating a session file having a play history field and a question answer field;

DETAILED DESCRIPTION OF THE INVENTION

The above described drawing figures illustrate several embodiments of the invention, a media system 20 for selecting, organizing, and playing a plurality of suitable media clips 82 drawn from at least one media file 32. The media system 20 of the present invention takes a unique approach to data organization that is not shown in the prior art. The media system 20 organizes data by treating it like a four-dimensional object which can be "sliced" and reorganized as desired by the user 10 to create a custom media presentation that exactly meets the requirements of the user 10. The four dimensions employed by the preferred embodiment of this technology are Width, Depth, Height, and Time. For purposes of this application, the four dimensions refer to the Topic of the media clip, the Complexity of the clip, the Order of the clips with respect to each other, and the length of Time of each clip. The specific dimensions employed, however, may be changed by those skilled in the art without departing from the scope of this invention.

Figure 1:
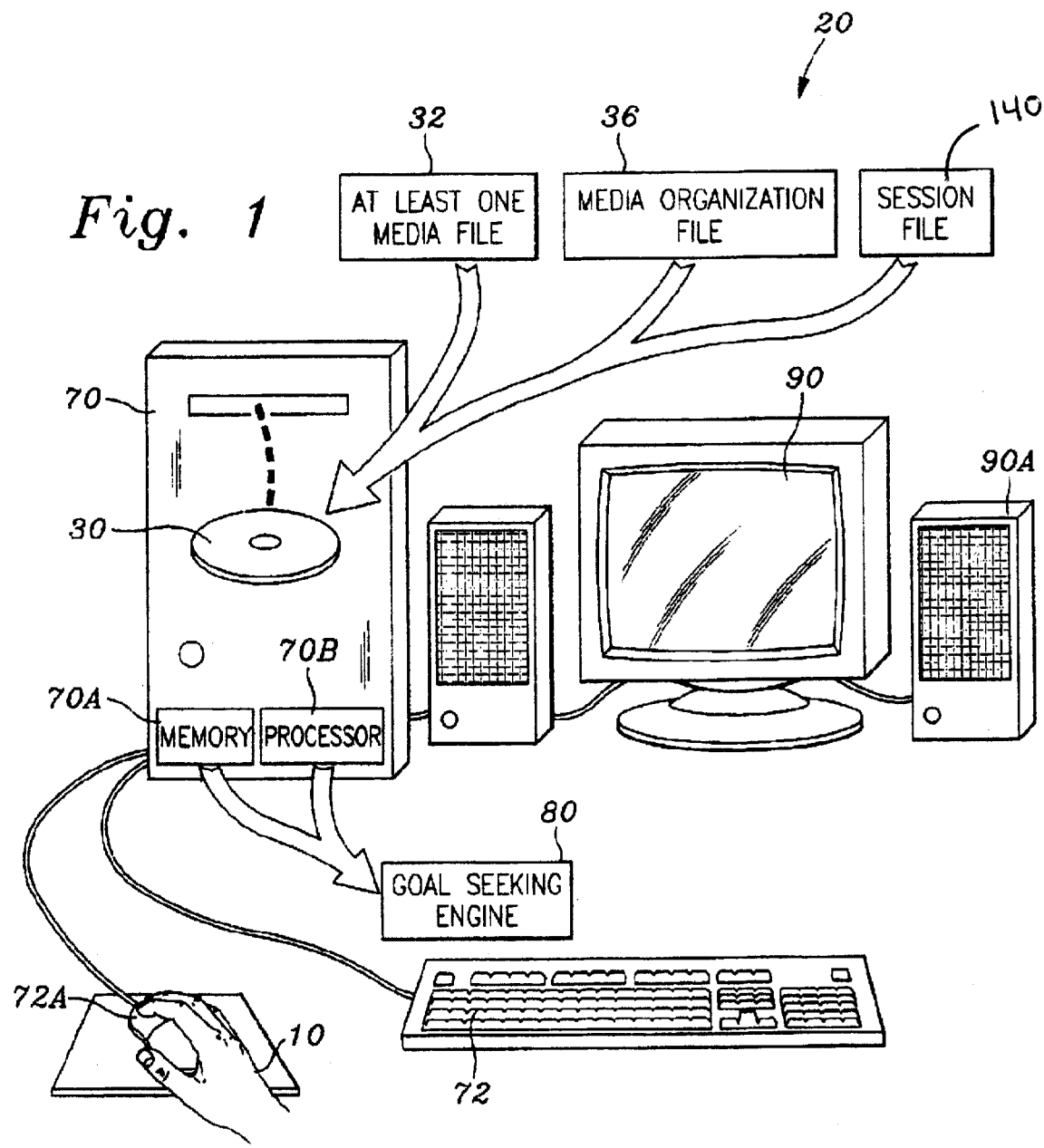
FIG. 1 is a perspective view of a personal computer useful for practicing the preferred embodiment of the present invention.
Figure 6A:
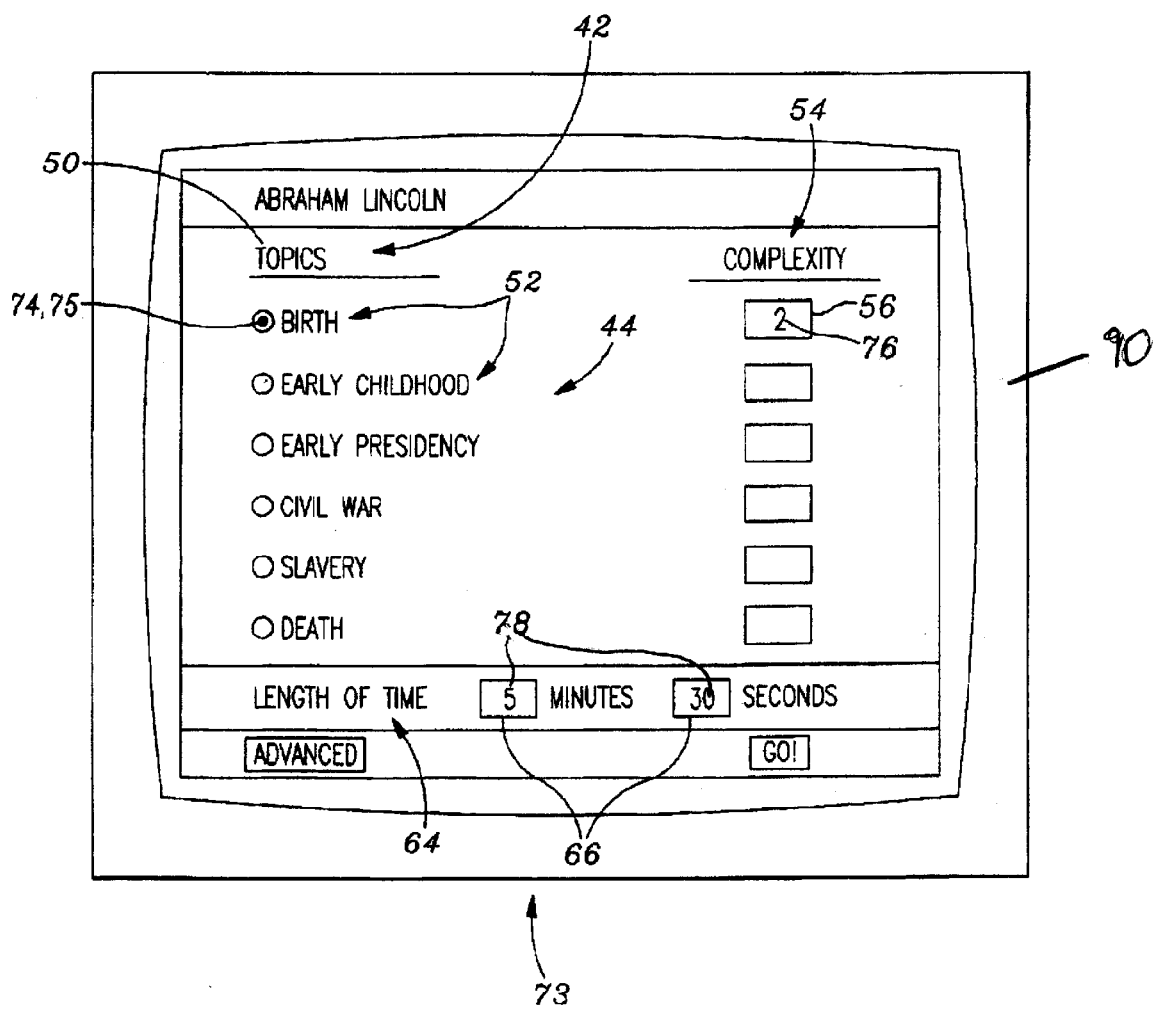
FIG. 6A is a computer monitor screen upon which is displayed a first embodiment of a means for receiving a plurality of desired media descriptions, the means for receiving being an interface program generated by the personal computer to receive a desired topic, a desired complexity, and a desired play length.

As shown in FIGS. 1 and 2, the media system 20 includes a means for storing 30 ("storing means") the at least one media file 32 and a media organization file 36. The media organization file 36 includes a defining means 40 for defining at least two media selection parameters 42 (the dimensions), each of the at least two media selection parameters 42 (FIGS. 4 and 6A) having a plurality of media descriptions 44 (FIG. 6A). The media organization file 36 further includes a database means 46 for associating each of the plurality of media clips 34 with at least one of the plurality of media descriptions 44. The media system 20 includes a means for receiving 70 ("receiving means") at least two desired media descriptions 74 from the user 10, and a means for selecting 80 ("selecting means") the plurality of suitable media clips 82 from the plurality of media clips 34 based upon the at least two desired media descriptions 74. In the preferred embodiment, the media system 20 further includes a means for playing 90 the plurality of suitable media clips 82.

Figure 7:
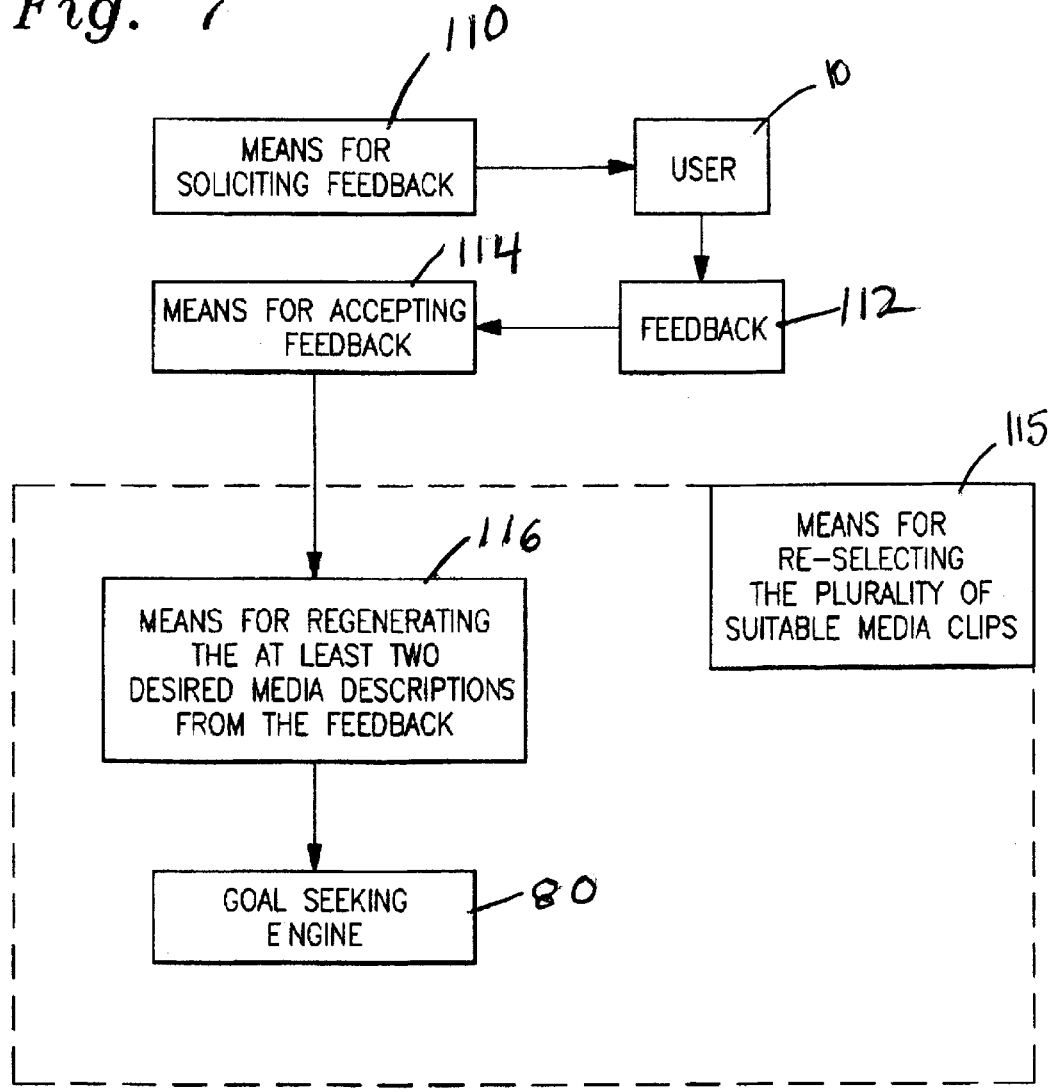
FIG. 7 is a flow diagram illustrating the steps used to solicit, receive, and use feedback from the user to reselect the plurality of media clips.

As shown in FIG. 7, the media system 20 further includes the means for soliciting feedback 110 from the user 10 and the means for generating the plurality of suitable media clips 82 based upon the feedback 112 received. In use, a user 10 first enters at least two desired media descriptions 74. The at least two desired media descriptions 74 are then inputed into a 24 goal seeking engine 80, which selects and organizes a plurality of suitable media clips 82 from the at least one media file 32. In the preferred embodiment, the media system 20 further includes the means for soliciting feedback 110 from the user 10, a means for accepting feedback 114 of the user 10, and a means for regenerating 116 the plurality of suitable media clips 82 from the feedback 112. In the most preferred embodiment, the means for regenerating 116 operates by regenerating the at least two desired media descriptions 74 from the feedback 112, and inputing the at least two desired media descriptions 74 into the goal seeking engine 80 to regenerate the plurality of suitable media clips 82.

The Storing Means

The storing means 30 is preferably a digital storage media capable of storing both the at least one media file 32 and the media organization file 36. The storing means 30 can be selected by those skilled in the art from a variety of suitable storage media, including magnetic storage disks, tapes, hard-drives, optical storage disks, memory chips, or other suitable media that are well known to those skilled in the art. As shown in FIG. 1, the storing means 30 is a compact disk ("CD") which can be easily packaged, sold, and transported in the same way as traditional media.

Those skilled in the art can devise many forms of storing means 30. Since the specific storing means 30 used is not critical to the novelty of the invention, any equivalent storing means 30 should be considered within the scope of this invention.

The Media File(s) and Media Clip(s)

As shown in FIG. 2, the at least one media file 32 contains the content that is to be experienced by the user 10. The at least one media file 32 can be any form of media that conveys information, including but not limited to text (such as .txt, .html, and .doc), audio (such as CD, .mp3, midi, and .wav), animation (such as Macromedia® Flash™), images (such as .jpeg and gif) and video (such as DVD, MPEG, and avi). The at least one media file 32 contains a plurality of media clips 34. Each of the plurality of media clips 34 represents a specific user experience; and it is the selection and combination of the plurality of media clips 34 that creates the final work which is viewed by the user 10.

As shown in FIG. 3A, in the preferred embodiment the at least one media file 32 includes many media files, each media file functioning as one of the plurality of media clips 34. While this embodiment increases the total storage space necessary to store all of the overlapping material in multiple files, it makes other aspects of the programming and function easier and faster, so this embodiment is currently preferred. In an alternative embodiment, as shown in FIG. 3B, the at least one media file 32 is one large file from which the plurality of media clips 34 are drawn. For example, one clip could be defined as the first 30 seconds of the large file; and a second clip could be defined as starting at 30 seconds and continuing for 1 minute and 5 seconds. It is possible that two or more of the plurality of media clips 364 overlap. In an example of such a case, the third clip may be Up defined as starting after 1 minute and 35 seconds and continuing for 1 minute, while the fourth clip may be defined as starting after 1 minute and 45 seconds and continuing for 35 seconds. In this fashion, a single media file 32 can be "cut up" into the plurality of media clips 34.

The Media Organization File

The media organization file 36 is used to enable the sorting and selection of the plurality of media clips 34 by the goal searching engine 80 and the means for regenerating 116 the plurality of suitable media clips 82. The media organization file 36 is associated with a defining means 40 and a database means 46.

The Defining Means

As shown in FIG. 4, the media organization file 36 is associated with the defining means 40 for defining at least two media selection parameters 42. Each of the at least two media selection parameters 42 has a plurality of media descriptions 44. Those skilled in the art can devise a variety of media selection parameters 42, and the parameters can vary depending upon the nature of the plurality of media clips 34 and the intended use of the media system 20.

In the embodiment shown in FIG. 4, the at least two media selection parameters 42 include a topic parameter 50 having at least one topic 52, a complexity parameter 54 having at least one complexity rating 56, an order parameter 60 having at least one order rating 62, and a time parameter 64 having a length of time 66. The at least one topic 52 preferably includes various major topics, as one would expect to see in a table of contents. The at least one complexity rating 56 and the at least one order rating 62 are preferably a range of numerals. For example, the at least one complexity rating 56 could be a range of numerals from 1–10 and the at least one order rating 62 could be the numerals within the range of 1–100. The length of time 66 is preferably a numeric measurement of time in an appropriate interval length. A further discussion of these parameters, as well as a practical example, is provided below.

The Database Means

Figure 5:
FIG. 5 is a table illustrating a database means of the media organization file.

As shown in FIG. 5, the media organization file 36 further includes a database means 46 for associating each of the plurality of media clips 34 with at least one of the plurality of media descriptions 44 and with at least one of a plurality of questions 122. In the preferred embodiment, the database means 46 associates each of the plurality of media clips 34 with at least one of the at least one topic 52, at least one of the at least one complexity rating 56, at least one of the at least one order rating 62, and the length of time 66.

In a simple embodiment, as shown in FIG. 5, the database means 46 includes a simple table assigning each of the plurality of media clips 34 to at least one of the at least two desired media descriptions 74. It is important to recognize that this is an example of a simple version of this technology. In a preferred embodiment of this technology, it is expected that the database means 46 will include a complex relational database including the above-described data. A relational database, while complicated to produce, is necessary to provide the most effective results from any given search. In such a relational database, each of the plurality of media clips 34 is associated with a different one of the plurality of media descriptions 44 depending upon the context of the search.

Each of the plurality of media clips 34 is preferably also associated with at least one of the plurality of questions 122, as shown in FIG. 9A. Each of the plurality of questions 122 is further related to either at least two desired media descriptions 74, as shown in FIG. 9B, or at least one of the plurality of media clips 34, as shown in FIG. 9C. This aspect of the database means is discussed in greater detail below.

The Interface Program

As shown in FIG. 6A, the means for receiving 70 the at least two desired media descriptions 74 from the user 10 is an interface program 73 operably installed to function on a personal computer having a memory 70A and a processor 70B, as shown in FIG. 1. The personal computer 70 is operably connected to a data input mechanism 72, such as a keyboard 72 and a mouse 72A. While the keyboard 72 and the mouse 72A are preferred, those skilled in the art can devise many equivalent mechanisms, such as a microphone and voice recognition software (not shown), and such equivalent embodiments are within the scope of the claimed invention. Since such computers and peripherals are well known in the art, a further detailed description is not required.

The interface program 73 functions to solicit and receive each of the at least two desired media descriptions 74 corresponding to one of the at least two media selection parameters 42. As shown in FIG. 6A, the interface program 73 preferably draws upon the media organization file 36 to produce a screen display on the monitor 90. The screen display allows the user 10 to use the keyboard 72 and the mouse 72A to input the at least two desired media descriptions 74. In the preferred embodiment, the at least two desired media descriptions 74 include a desired topic 75, a desired complexity 76, and a desired play length 78. By imputting this information, the user 10 is able to control the output of the media system 20 so he user 10 can select only appropriate portions of the media content. In this embodiment, the interface program 73 draws upon the media organization file 36 to produce a screen display on the monitor 90 that lists the at least one topic 52, the at least one complexity rating 62, and the desired play length 78.

In the most preferred embodiment, the interface program 73 is expandable to an advanced mode, shown in FIG. 6B, that allows the user 10 the option of controlling many details of the information required. For example, when the user 10 requests information about the birth of Lincoln, he or she can request an advanced control box 124 that offers more detailed listing of the at least one topic 52, such as information about the Lincoln family emigrating from England and information about Lincoln's father's birth in Virginia. The user 10 then has the option of either allowing the media system 20 to prepare a general discussion of Lincoln's birth, or micromanaging the production to get information of specific interest or to exclude information that is not of interest.

Through the personal computer 70 and the keyboard 72 and the mouse 72A, the user 10 is able to input the at least two media descriptions 74 into the interface program 73. In the preferred embodiment, the user 10 simply selects the at least two media descriptions 74 from the plurality of media descriptions 44 and by inputting the desired play length 78, as shown in FIG. 6A. While it is preferred that the user 10 directly manipulate the at least two media descriptions 74, for maximum control, it should be noted that many forms of "front end" can be placed on this type of system without altering the fundamental structure of the media system 20. For example, in another embodiment the user 10 might input a "plain English" description of the presentation he or she would like. An artificial intelligence built into the interface program 73 would then determine the at least two media descriptions 74 based upon techniques that are known to those skilled in the art. The selections made by the user 10 are inputted into the goal seeking engine 80, as described below.

Demographics

In a further embodiment, as shown in FIG. 6C, the interface program 73 solicits and accepts a plurality of desired user demographics 79 such the age, city of residence, sex, and income of the user 10, as well as information about interests, hobbies, favorite sports and activities, and other information of interest to advertisers. This embodiment enables an entirely different functionality, wherein the media system 20 is used to send targeted advertisements to the user 10 rather than to generate a custom showing of content. In this embodiment, the plurality of media clips 34 include several commercials, and the demographic information gathered is used to select those advertisements in which the user 10 would be interested.

For example, in order to have a desired movie transmitted to the personal computer 70 for viewing, the user 10 might agree to view a given number of commercials. To make such a transaction the most desirable to both parties, it is helpful if (1) the commercials are of interest to the user 10, and (2) the user 10 pays attention to the commercials.

By entering demographic information into the media player, the personal computer 70 is able to precisely target advertising to the user 10, either by the interests of the user 10 or by his or her demographic location, or both. This increases the value of the advertising to the advertiser because the advertisements are directed to interested consumers. It also increases the value of the advertising to the user 10, because the user 10 is able to watch commercials for products in which he or she might be very interested. A young male who is an avid paintball player, for example, might be interested in learning about a new brand of paintball marker, while he would only be annoyed by a commercial for baby food. This enables companies to precisely target information to niche markets rather than generally broadcasting generic information to only the largest segments of society.

Demographic information can be altered and expanded upon throughout the use of the media system 20, to constantly modify and improve the messages being received by the user 10, as described in further detail below.

The Goal Seeking Engine

The means for selecting 80 a plurality of suitable media clips 82 from the plurality of media clips 34 is preferably a goal seeking engine for performing several selection steps. The goal seeking engine 80, a critical component of the media system 20, functions by comparing the at least two desired media descriptions 74 with the plurality of media descriptions 44, selecting the suitable media clips 82 that match the selected criteria, and then selecting the plurality of suitable media clips 82, as described below.

First, the goal seeking engine 80 selects, from the plurality of media clips 34, only those that are associated with the at least one topic 52 that matches the desired topic 75. This can be a relatively simple step, or a relatively complex step, depending upon the complexity of the database means 46.

Second, from those media clips that are associated with the at least one topic 52, selecting only those media clips that are associated with the at least one complexity rating 56 that matches the desired complexity 76. It is important to understand that simply selecting certain complexity ratings 56 is a simplification of the final commercial product. In the preferred embodiment, the goal seeking engine 80 does not just select certain numbers, but uses an algorithm to aggregate a range of numbers (using a number of methods including averaging, weighted averaging, et cetera) to select those of the plurality of media clips 34 whose complexity rating 56 approximately matches the desired complexity 76. The user 10 ultimately has control over the range of discretion allowed the goal seeking engine 80, and in the preferred embodiment the user 10 can adjust the "advanced controls" of the goal seeking engine 80 to fine tune the amount of variation that the goal seeking engine 80 is allowed.

Third, from those media clips that are associated with both the at least one topic 52 that matches the desired topic 75 and the at least one complexity rating 56 that matches the desired complexity 76, the goal seeking engine 80 selects the plurality of suitable media clips 82 which are not duplicates, based on the order rating 62, and the sum of whose length of time 66 is approximately equal to the desired play length 78.

To make this selection, the goal seeking engine 80 preferably includes a software program that implements a goal seeking algorithm. The goal seeking algorithm 80 sorts the potentially available combinations of the plurality of media clips 34 to select the plurality of suitable media clips 82 that most closely match the requested characteristics, yet still fit within the desired play length 78. The goal seeking algorithm 80, or an equivalent, is critical because it is expected that, in many searches, many of the plurality of media clips 34 meet the requirements described by the user 10—and it is necessary to select only some of the plurality of media clips 34 to arrive at a result that matches the length of time 66 requested by the user 10. The goal seeking algorithm 80 sorts these possibilities and determines a combination that most closely fits the needs of the user 10.

Such a search algorithm preferably first organizes the available clips, generally placing larger clips first for easier sorting. The goal seeking engine 80 then preferably uses a recursive search technique to assemble likely combinations, comparing the results with the desired play length, and then substituting smaller files for larger files to reduce the size of overall play length until the desired play length is attained. Such recursive search techniques are well known to those skilled in the art. A more detailed discussion of the goal seeking algorithm 80, such as the knapsack algorithm, is contained in Algorithms, A Functional Programming Approach, 2d Edition, by Fethi Rabhi and Guy Lapalme, hereby incorporated by reference in full.

The goal seeking algorithm 80 preferably also has the ability to allow for repetition of material to create the most effective final product. In the preferred embodiment, in cases in which the sum of the lengths of time 66 of the plurality of suitable media clips 82 is less than the desired play length 78, or when otherwise suitable, the goal seeking engine 80 has the ability to insert additional media clips which either overlap or are duplicates of one or more of the plurality of suitable media clips 82. Suitable duplicates can be determined based upon the desired topic 75, the desired complexity 76, the length of time 66, and the order parameter 60 associated with each of the clips. For example, if the media organization file 36 shows that two of the plurality of media clips 34 overlap and have the same order parameter 60, with one clip being 5 minutes and the second being 2 minutes, the goal seeking engine 80 will initially select the 5 minute clip for display. Then, if there is additional time available, the goal seeking engine 80 might select the 2 minute segment to repeat and emphasize the point. This is particularly likely to occur if the 2 minute media clip contains information that is close to the complexity or interest specified by the user 10.

In many cases, the goal seeking algorithm 80 can sort the results of a search to create a media experience in which the sum of the length of time 66 of all of the plurality of suitable media clips 82 is almost exactly equal to the desired play length 78. However, it is only required that the sum of the length of time 66 of all of the plurality of suitable media clips 82 be approximately equal to the desired play length 78. For purposes of this invention, the sum need only roughly approximate the desired play length 78. In some searches, there may be a substantial difference between the sum and the desired play length 78. In the preferred embodiment, the user 10 can control how close that goal seeking engine 80 can come to its goal. For example, the user 10 might request a 30 minute presentation and allow 15 minutes in variation. In another example, the user 10 might request a 2 minute presentation that must be exactly 2 minutes. In most cases, the goal seeking engine 80 should be able to very closely meet even the most stringent requirements of the user 10; however, greater processing time will be required to meet stringent search criteria. A carefully prepared and formatted media organization file 36 makes it possible for the sum and the desired play length 78 to be nearly exactly equal.

Finally, the plurality of suitable media clips 82 are ordered based on the order rating 62. Once again, a linear solution to the process of ordering the plurality of suitable media clips 82 is a simplified version of the preferred embodiment. In the preferred embodiment, the goal seeking engine 80 uses relational database techniques to assign different order ratings 62 to each of the plurality of suitable media clips 82 based upon which other media clips have been selected.

While the best mode of the present invention has been described in detail, it is important to recognize equivalent techniques can be devised by those skilled in the art, and these alternative techniques should be considered within the scope of the claimed invention. The key to the present invention lies in the categorization of the plurality of media clips 34 and then the dynamic generation of a custom media production, on the fly, to the specific requirements of the user 10. Those skilled in the art can develop equivalent search routines, and these search routines should be considered within the scope of the invention.

Much of the success of the media system 20 depends upon the creation and editing of the media organization file and the plurality of media clips 34. If the plurality of media clips 34 are long and not skillfully edited, the search results will be of lower quality. It is worth noting, however, that a poorly executed search engine, which is not efficient in this matching step, should still be considered within the scope of this invention. The requirement that the sum of the length of time 66 of all of the plurality of suitable media clips 82 be approximately equal to the desired play length 78 should not be construed as requiring that another search engine be effective in matching the sum and the desired play length 78 in order to infringe. It is also worth noting that if the user 10 requests a very narrow field of data and the desired play length 78 is very large, the media presentation may be significantly shorter than the desired play length 78; although the use of repetition by the goal seeking engine 80 could potentially alleviate the disparity.

The Media Player

In the preferred embodiment, the media system 20 further includes a means for playing 90 the plurality of suitable media clips 82. In the preferred embodiment, the playing means 90 is a monitor 90 and a pair of speakers 90A that are operatively attached to the personal computer 70. The monitor 90 and the pair of speakers 90A are well known in the prior art and do not constitute an inventive aspect of the invention. It is possible that many devices might be devised by those skilled in the art to play the media formatted according to the teachings of this invention, and these alternative embodiments should be considered within the scope of this invention.

A First Example of Use—Documentary of Abraham Lincoln

In an example of a practical application of this technology, we will describe the use of the above-described technology to format and view a movie about Abraham Lincoln.

According to the teachings of this invention, as shown in FIGS. 2–6C, the movie is first segmented into the plurality of files 32, each of the plurality of files 32 containing a discrete segment of the movie and representing one of the plurality of media clips 34. Determining how to properly edit and select each of the plurality of media clips 34 requires a great deal of skill, creativity and experience, so it is expected that this will be performed by a professional. The professional then creates the defining means 40 to define the at least two media selection parameters 42 and their respective plurality of media descriptions 44. According to the preferred embodiment, the media selection parameters 42 include at least one topic 52, a complexity parameter 54 having at least one complexity rating 56, an order parameter 60 having at least one order rating 62, and a time parameter 64 having a length of time 66; however, it should be kept in mind that other parameters may be devised by those skilled in the art.

In the current example involving the life of Abraham Lincoln, the professional could then create topics 52 that are relevant to the life of Abraham Lincoln, such as a birth topic, an early childhood topic, an early presidency topic, a civil war topic, a slavery topic, and a death topic. The professional would then define the complexity rating 56, such as 1–10, with 1 including very general information and 10 including very specific details. Finally, the professional would then define the at least one order rating 62, such as a scale of 1–100, with 1 including being the first clip in the story and 100 being the last clip. As described above, the use of a linear scale is a simplified version to facilitate understanding of the invention. In the preferred embodiment, the database means 46 would be a relational database would allow the plurality of media clips 34 to be organized relative to each other, allowing a large plurality of complexity ratings 56 and order ratings 62 to be associated with each of the plurality of media clips 34.

Once the defining means 40 has been created, each of the plurality of media clips 34 is then categorized in the database means 46. In this step, each of the plurality of media clips 34 is then associated with at least one of the at least one topic 52, at least one of the at least one complexity rating 56, and at least one of the at least one order rating 62. Completing the relational database 46 described above would often be a long and difficult task, but it would provide the best response to the query of the user 10. Finally, each of the plurality of media clips 34 is associated with the length of time 66 of the media clip, which is objectively determined.

Following the example described above, FIG. 5 shows a sample table categorizing four media clips. The first media clip, which is 10 minutes in length and generally describes the birth of Abraham Lincoln, is categorized under the topic of birth, with a complexity of 1, and order of 1, and a time of 10 minutes. The second media clip, a 5 minute segment of the first media clip which eliminates some of the background material included in the first clip, is categorized under the topic of birth, with a complexity of 1, and order of 1, and a time of 5 minutes; however, it is possible that the complexity could be higher, depending upon the nature of the information contained on the clip. The third media clip, a 2 minute clip generally describing the assassination of Abraham Lincoln, is categorized under the topic of death, with a complexity of 1, and order of 89, and a time of 2 minutes. The fourth media clip, a 2 minute clip describing certain particular details of the assassination, is categorized under the topic of death, with a complexity of 8, and order of 92, and a time of 2 minutes.

Once the professional has constructed the media organization file 36, it is stored on the storing means 30 along with the plurality of media clips 34. According to the preferred embodiment of this invention, the storing means 30 is a CD which is then distributed to consumers who are interested in the life of Abraham Lincoln. As described above, it is equally acceptable to distribute the described files via the global computer network or another known method of data distribution.

The user 10 then loads the described files into the personal computer 70 by inserting the CD 30, downloading the file, and activating the interface program 73. As shown in FIG. 6, the user 10 is presented the list of selections described above. Based upon the input of the user 10, as shown in FIG. 8, the goal searching engine means 80 selects the plurality of suitable media clips 82 for transmission to the playing means 90.

In the current example, the user 10 might select a 15 minute overview of the life of Lincoln. In this case, the goal seeking engine 80 would select clips 1 and 3 because they are of suitable complexity, and play clip 1 and then clip 3 based on their order. Clip number 2 would be rejected based upon the order parameter 60 because the goal searching engine would recognize that clips 1 and 2 are duplicates, and clip 1 is of a more suitable length. If the user 10 had requested only 7 minutes of presentation, the goal searching engine means 80 would select clips 2 and 3 as a more suitable combination.

Once the user 10 had viewed the overview, he or she may request 2 minutes of further details of the death of Lincoln, in which case the goal searching engine would reject clips 1 and 2 as the incorrect topic, but play clip 4 based upon meeting the stated criteria and meeting the time restrictions.

Of course, a typical product would often contain many hundreds or even thousands of media clips 34, allowing extremely complex presentations that can be customized in any respect to the needs of the user 10. This exceptional flexibility and customization allows enormous amounts of data to be readily searched, even by those unfamiliar with the field of the material, because the material has already been classified and organized by the professional that is knowledgeable in the field.

A Second Example of Use—Dissemination of Advertising Material

In a second example of a practical application of this technology, we will describe the use of the above-described technology to format and view a commercial for paintball equipment.

According to the teachings of this invention, the user 10 is first asked to input demographic information such as the user's age, city of residence, and major interest, as shown in FIG. 6C. Many commercials, each commercial targeting a specific demographic profile, are stored in the storing means and indexed, as described above. In a simple embodiment, each commercial is contained as one of the plurality of media clips. In a more complex embodiment, even the individual commercials are constructed of many of the plurality of media clips.

When a young male who is interested in sports enters his demographic data, he is further prompted to select his favorite sport, which causes him to select paintball. The media system then uses this information to select those commercials that are targeted to paintball players. In the preferred embodiment, several of the plurality of media clips are assembled, showing both generic clips of the product together with clips that are specific to the user 10.

For example, if the user 10 lives in Corona, Calif., he might be shown a clip of a player playing at the TOMB- STONE™ paintball park located in the city of Corona and also alerted of a special tournament that will be taking place at TOMBSTONE™ on the coming weekend. Such specific advertising, which has never before been possible, is simple using the media system 20.

The Means for Soliciting Feedback

As shown in FIG. 7, the media system 20 preferable includes the means for soliciting feedback 110 from the user 10, the means for accepting feedback 114, and a means for reselecting 115 the plurality of suitable media clips 82 to create a new media display responsive to the feedback 112 from the user 10.

Figure 8A:
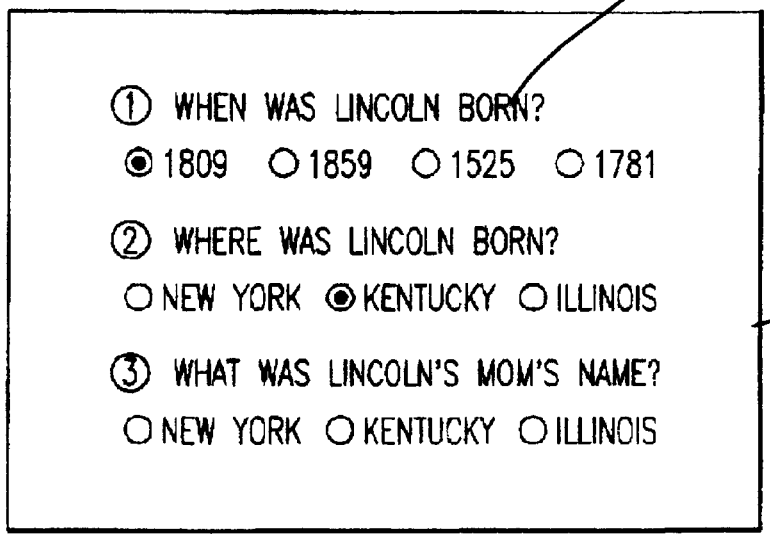
FIG. 8A is a computer monitor screen upon which is displayed a question program interface.
Figure 8B:
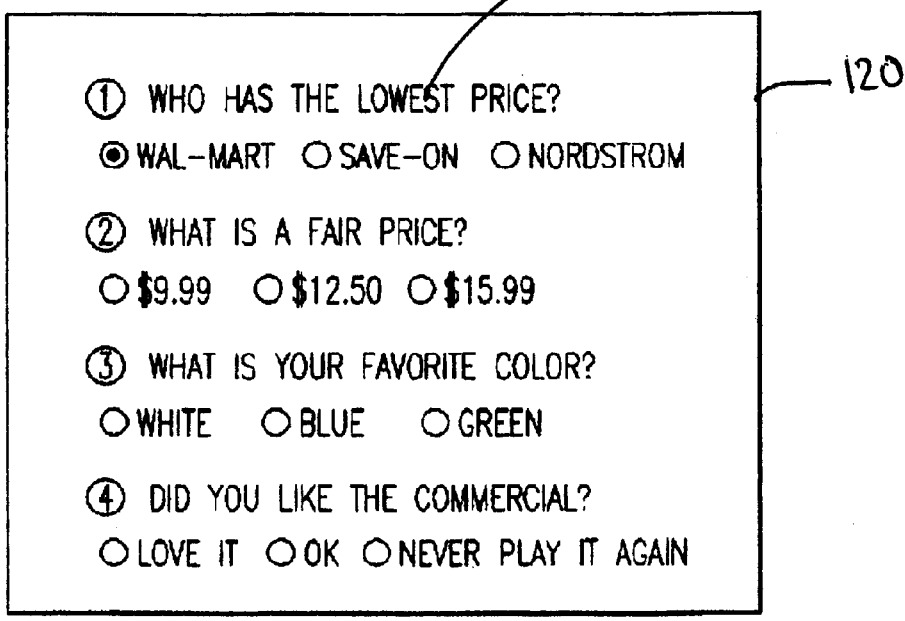
FIG. 8B is a computer monitor screen upon which is displayed an alternative version of the question program interface.
Figure 11:
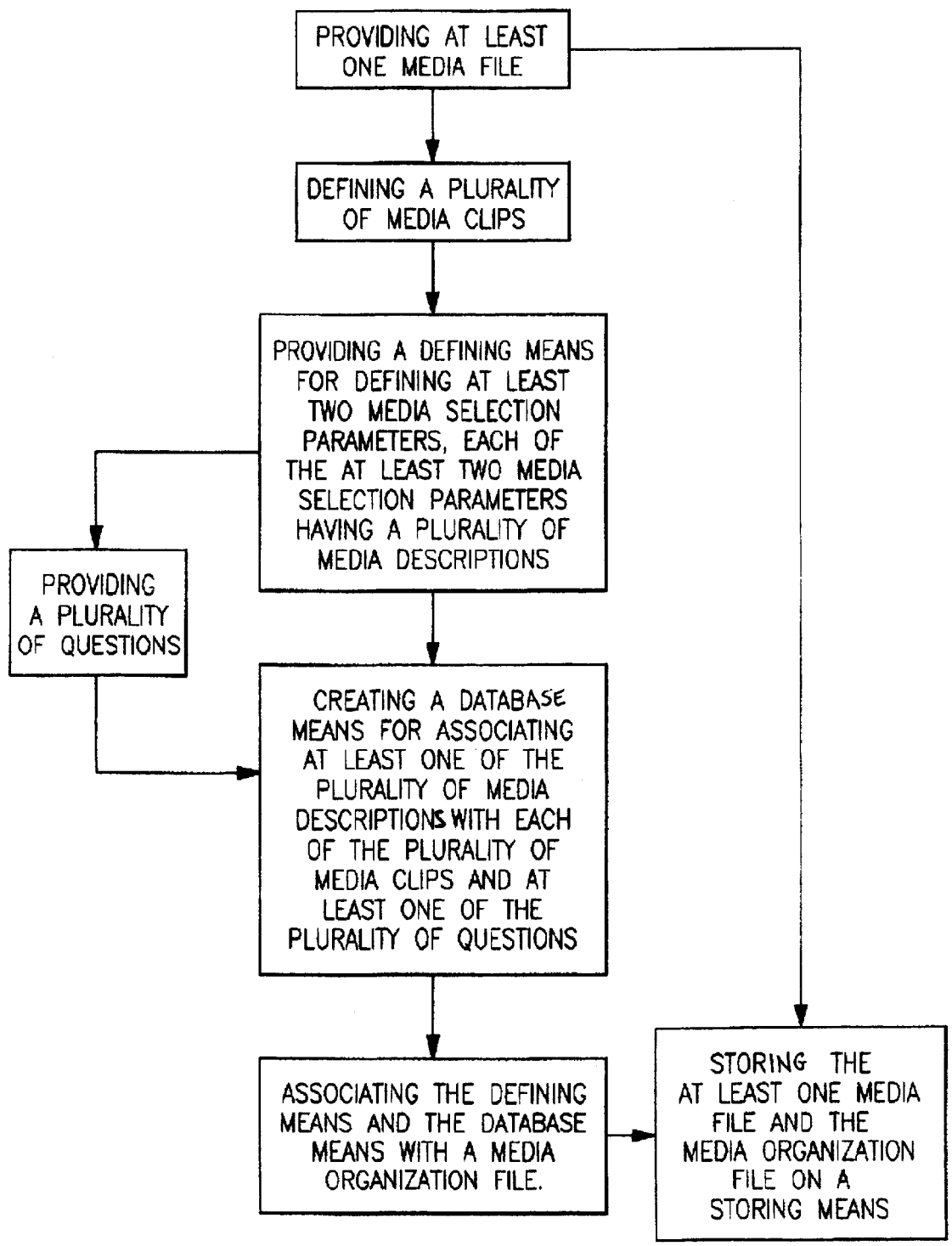
FIG. 11 is a flow diagram illustrating the steps used to produce the media organization file.
Figure 12:
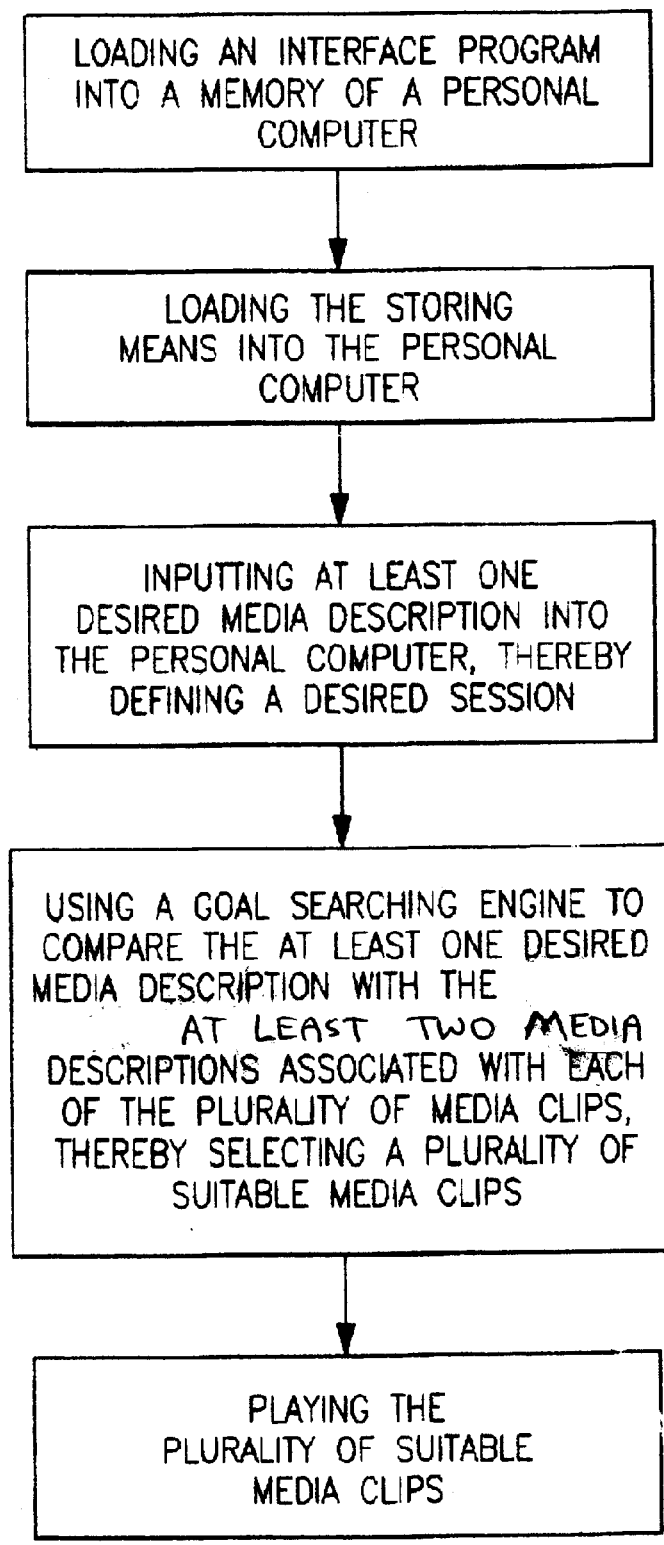
FIG. 12 is a flow diagram illustrating the steps taken by a user to select and view a plurality of suitable media clips.
Figure 13:
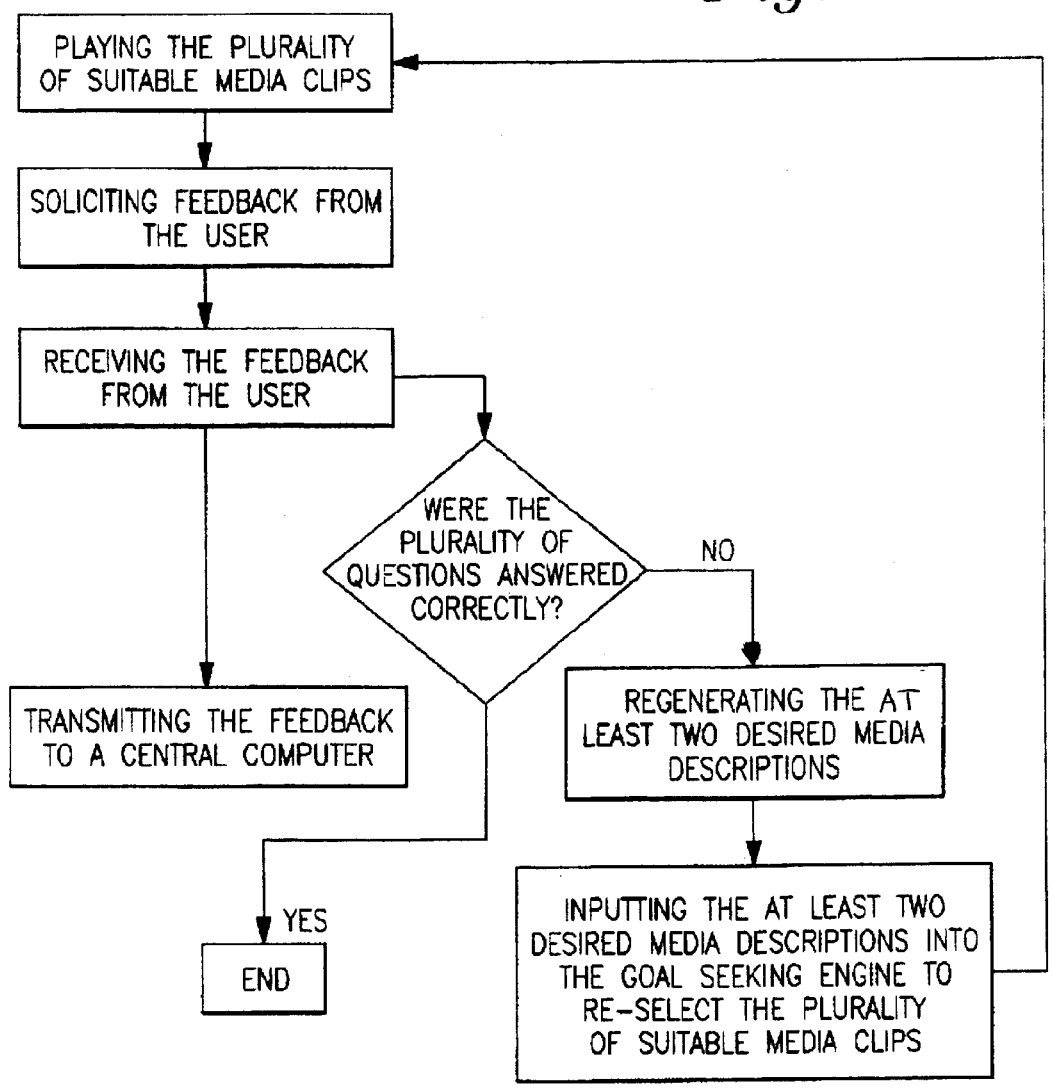
FIG. 13 is a flow diagram illustrating the use of feedback from the user to re-select the plurality of suitable media clips.

The means for soliciting feedback 110 preferably includes a question program interface 120 that generates a screen display, shown in FIGS. 8A and 8B to display the plurality of questions 122. The plurality of questions 122 are drawn from a table in the database means 46. In a simple embodiment, shown in FIG. 9A, each of the plurality of media clips 34 is linked to at least one of the plurality of questions 122. In this embodiment, the plurality of media clips 34 that are linked to questions that are answered incorrectly are either transmitted to the goal seeking engine 80 for sorting, or directly transmitted to the means for playing 90. In another embodiment, shown in FIG. 9B, each of the plurality of questions 122 is associated with the at least two desired media descriptions 74, and the at least two desired media descriptions 74 are then transmitted to the goal seeking engine 80 for processing, as described above.

The means for reselecting 115 the plurality of suitable media clips 82 preferably includes a means for regenerating 116 the at least two desired media descriptions 74 from the feedback 112, and the at least two desired media descriptions 74 are then entered into the goal seeking engine 80 for processing as described above.

Question Program Interface

As shown in FIGS. 8A and 8B, the means for soliciting feedback 110, the means for accepting feedback 114, and the means for reselecting 115 the plurality of suitable media clips 82 are provided by a question program interface 120 that is similar to the interface program described above; however, the question program interface 120 functions to present the user 10 with a plurality of questions 122 and to receive the feedback 112 entered by the user 10 into the question program interface 120 for processing. The plurality of questions 122 are designed to elicit useful information from the user 10. The information received is then used to refine the plurality of suitable media clips 82 to best provide the user 10 with the information in which he or she is interested.

In one example, as shown in FIG. 8A, the plurality of questions 122 are directed, like a test, to the facts disclosed by the plurality of suitable media clips 82 that has already been displayed.

For example, if the user 10 watches a program about the birth of Abraham Lincoln, the plurality of questions 122 might regard the year (or exact date) of Lincoln's birth, the state of his birth, and his mother's name. Such questions are designed to ascertain whether the user 10 has retained the desired contents of the media clips delivered; and if the questions are answered incorrectly, the goal seeking engine 80 can use the information provided by the answers to regenerate the plurality of suitable media clips 82 that teach the lesson with a different selection of media clips.

It is important to recognize that the implementation of this concept may include a more detailed approach than the simple example given herein. In the preferred embodiment, multiple questions can be included, and if the user 10 misses a question, additional questions will be automatically generated to flesh out the true extent of the user's understanding of the subject matter. For example, if the user 10 misses a question regarding the birthplace of Lincoln, the user 10 will receive additional questions about the subject matter related to this subtopic. The ability of the user 10 to answer some or all of these questions will better inform the goal seeking engine 80 as to what media clips need to be emphasized. In this scenario, one wrong answer might well be ignored, while many wrong answers may lead to the generation of an entire new media display to re-teach the subject matter to the user 10.

Such a feedback 112 mechanism is useful for use in schools and universities as well as for private use. Entire lesson plans can be formatted according to the teachings of this invention. Rather than grading students upon correct responses, the students using this approach would simply have to watch and re-watch a given lesson plan until all answers are answered correctly. Such a scenario not only removes competition among students, it also promotes learning as a desirable thing—those students who do not study will be forced to spend their free time watching and re-watching lesson plans that other students have avoided by studying hard the first time around. The pursuit of additional free time will actually motivate the laziest students to study the hardest.

Marketing Feedback

In a second embodiment, as shown in FIG. 8B, the plurality of questions 122 solicit marketing feedback in addition to questions directly relating to the facts disclosed in the initial plurality of suitable media clips 82. The marketing feedback includes information about what price the user 10 would be willing to pay, what colors, styles, and accessories the user 10 would prefer, and even information about the commercial itself, whether the commercial was funny or annoying.

This second embodiment is most useful when used in conjunction with the commercial delivery vehicle described above. Following the collection of the demographic data and the presentation of the plurality of suitable media clips 82, described above, the user 10 is presented the additional questions to constantly improve and refine both the product and the product delivery. This allows the sponsor to conduct a detailed focus group with all of the potential customers who watch the commercial. Such a system can also be used to directly sell the product to the consumer, as described below.

Asking the user 10 to answer questions about the commercial allows the sponsor to punctuate important points or pieces of information. Such questioning also functions to assure the sponsor that the user 10 has paid attention to the commercial. If the user 10 was not paying attention and answers incorrectly, the user 10 may be required to watch the commercial again. Sponsors who have this assurance that their commercials will be watched with attention and interest will be willing to pay a higher advertising rate than those who anticipate that most of their commercials will be ignored or electronically skipped.

While the two above-described embodiments represent the preferred method of practicing this invention, those skilled in the art can devise alternative methods that are equivalent to the above-described methods, and these alternative methods should be considered within the scope of the below-described claims. Specific alternative embodiments include an email delivery of a message containing the above described plurality of questions 122, to which the user can reply with responses completed in a standardized way that enables automatic data capture of the response received in the reply email.

Means for Reselecting the Plurality of Suitable Media Clips

The media system 20 includes a means for reselecting 115 the plurality of suitable media clips 82 based upon the feedback 112 gathered from the user 10. In the embodiment shown in FIG. 9B, the means for reselecting 115 includes a means for regenerating 116 the at least two desired media descriptions 74 from the feedback 112, and the at least two desired media descriptions 74 are then transmitted to the goal seeking engine 80 for processing as described above. In this embodiment, the means for regenerating 116 is preferably a table in the database means 46 wherein each of the plurality of questions 122 is linked to the at least two desired media descriptions 74.

In this embodiment, if a question is answered incorrectly, the at least two desired media descriptions 74 associated with that question are transmitted to the goal searching engine 80, in the same manner as described above, to produce the plurality of suitable media clips 82. The plurality of suitable media clips 82 generated is designed to re-instruct the user 10, so he or she can learn the material that was not learned during the first viewing.

In another embodiment, as shown in FIG. 9C, the means for reselecting 115 is provided by a table in the database means 46 wherein each of the plurality of questions 122 is linked to at least one of the plurality of media clips. The selected media clips are then fed into the goal seeking engine 80, where the plurality of suitable media clips 82 are selected and organized. While these simple mechanisms are currently preferred, those skilled in the art can devise equivalent mechanisms for accomplishing the same goals, and these equivalent mechanisms should be considered within the scope of the claimed invention.

Session File

As shown in FIG. 10, the media system 20 preferably includes a session file 140 that stores session information 142 regarding the activities of the user 10 in a temporary file for the purpose of improving the search results generated. The session information 142 is preferably associated with each of the plurality of media clips 34. The session information 142 preferably includes a play history field 144 that shows whether the media clip 34 has been played before, and a question answer field 146 that shows whether the question associated with the media clip has been answered correctly or incorrectly.

In use, the goal seeking engine 80 continuously updates the session information 142 and then consults the session information 142 during the process of selecting the plurality of suitable media files. After the user 10 has viewed several sessions using the media system 20, the goal seeking engine 80 will gain a valuable source of information to improve its performance. For instance, if the user 10 watches clip 2, a 5 minute clip about the birth of Lincoln, and is unable to answer the related question, "Where was Lincoln born?", the goal seeking engine 80 might favor clip 1, which is a more complete 10 minute clip about the birth of Lincoln. If the user 10 watches clips 7, 9, and 11, and is not able to answer the related questions, the goal seeking engine 80 might favor related clips 8, 10, and 12 during the second attempt at generating the plurality of suitable media clips 82.

Distribution Via The Global Computer Network

Figure 14:
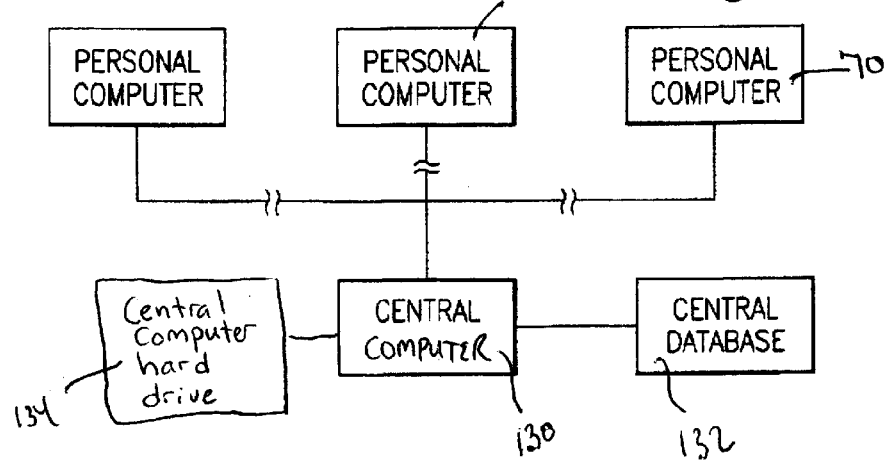
FIG. 14 is a block diagram illustrating a plurality of personal computers connected via a global computer network to a central computer.

While we have referred to the use of a CD 30 having at least one media file 32 that can then be customized by the user 10, it is also possible to utilize this technology in other ways. In an alternative embodiment shown in FIG. 14, the storing means 30 is a central computer hard-drive 134 of a central computer 130 operably connected to at least one personal computer 70 via a network such as a global computer network. The central computer 130 is programmed by one skilled in the art and includes a central database 132 to directly download data to any of the personal computers that request the data. In one embodiment, the central computer 130 downloads the at least one media file 32 and the media organization file 36 to the hard-rive or RAM of one of a network of personal computers via a global computer network. In another embodiment, the at least one media file 32 and the media organization file 36 remain resident on the central computer 130, and only the plurality of suitable media clips 82 are transmitted to the personal computer, via either download or streaming technologies. As will Up be recognized by those skilled in the art, this allows content providers to sell content in small and customized packages rather than just in bulk. The user 10 could obtain a small segment of content, presumably for a lower cost, rather than be required to purchase an entire work. It also allows the content provider to collect fees for each segment of the work, rather than only one fee for the entire work.

An active connection to the central computer 130 enables additional functionality. One example of added functionality includes the capability to direct the session files 140 generated by the various users 10 to the central computer 130 where the results can be analyzed to enhance the media product. For example, if many users 10 view clip 2 and are unable to answer the related question correctly, then this clip might eventually be reviewed and possibly revised or removed. If the users 10 who view clip 1 are almost always able to correctly answer the related question, clip 1 might be "tagged" as a preferred clip that will always be included when possible. Those skilled in the art of designing intelligent networks can devise many improvements along these lines to constantly review and improve the results of the goal seeking engine 80.

Advertising Feedback

Connection of the media system 20 to a central computer 130 via the global computer network also enables another feature of the present invention, namely the ability to report marketing information directly back to the producers of the at least one media file or their so advertisers. As described above, and as shown in FIGS. 6C and 8B, the media system 20 has the capability of collecting large quantities of valuable demographic and marketing information. It would be commercially valuable to collect this information at a central location for processing and analysis.

Product Sales

Another aspect of the media system 20 described herein is that such a system can also be used to directly sell a product to the consumer. An analysis of the demographic data, the plurality of suitable media clips 82 that are suitable, and the other input made by the user 10, a commercial entity controlling the central computer 130 would be uniquely situated to make sales to the user 10. After the user 10 who is interested in paintball watches several sessions, answers questions, and provides the necessary marketing feedback 112, it should be pretty clear what types of products the user 10 might be interested in purchasing. If the user 10 watches several sessions regarding the performance of several paintball markers, the central computer 130 might transmit an offer to sell a paintball marker at a special bargain rate. Information about commercial sales could then be added to the session information 142, to further refine the quality of the sessions produced by the goal seeking engine 80.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A media system for playing media based upon feedback from a user, the media system comprising:
    a means for storing;
    at least one media file;
    the at least one media file having a plurality of media clips,
    a defining means for defining at least one topic, at least one complexity rating, and at least one order rating;
    a database means for associating each of the plurality of media clips with one of the at least one topic, one of the at least one complexity rating, and one of the at least one order rating;
    a means for receiving a desired topic and a desired complexity;
    a goal seeking engine for selecting from the plurality of media clips a plurality of suitable media clips wherein the one of the at least one topic associated with each of the selected suitable media clips matches the desired topic, the one of the at least one complexity rating associated with each of the selected suitable media clips matches the desired complexity, and the one of the at least one order rating associated with each of the selected suitable media clips do not match indicating that the selected suitable media clips are not duplicates;
    a means for playing the plurality of suitable media clips for the user;
    a means for soliciting feedback of the user;
    a means for accepting feedback of the user; and
    a means for reselecting the plurality of suitable media clips from the feedback.

2. The media system of claim 1 wherein the means for reselecting the plurality of suitable media clips operates by regenerating the at least two desired media descriptions from the feedback, and inputting the at least two desired media descriptions into the goal seeking engine.

3. The media system of claim 1 further comprising a means for transmitting the feedback to a central computer.

4. The media system of claim 1 wherein the means for soliciting feedback and the means for accepting feedback are provided by a question program interface having a plurality of questions, each of the plurality of questions being associated with at least one of the plurality of media clips.

5. The media system of claim 4 wherein the means for reselecting the plurality of suitable media clips is a table in the database means that associates each of the plurality of questions with the at least two desired media descriptions.

6. The media system of claim 4 wherein the means for reselecting the plurality of suitable media clips is a table in the database means that associates each of the plurality of questions with at least one of the plurality of media clips.

7. A media system comprising:
    a means for storing;
    at least one media file;
    a media organization file;
    the at least one media file having a plurality of media clips,
    the media organization file having a defining means for defining at least one topic, at least one complexity rating, at least one order rating, and a length of time;
    the media organization file further having a database means for associating each of the plurality of media clips with one of the at least one topics, one of the at least one complexity ratings, one of the at least one order ratings, and the length of time;
    a means for receiving a desired media description into the media player system, the at least two media descriptions including a desired topic, a desired complexity, and a desired play length;
    a goal seeking engine for performing the following steps:
        a) selecting from the plurality of media clips only those media clips that are associated with the at least one topic that matches the desired topic;
        b) selecting from those media clips that are associated with the at least one topic only those media clips that are associated with the at least one complexity rating that matches the desired complexity;
        c) selecting, from those media clips that are associated with both the at least one topic that matches the desired topic and the at least one complexity rating that matches the desired complexity, a plurality of suitable media clips which are not duplicates, based on the at least one order rating, and the sum of whose length of times are approximately equal to the desired play length; and
        d) ordering the plurality of suitable media clips based on the at least one order rating;
    a means for playing the plurality of suitable media clips;
    a means for soliciting feedback;
    a means for accepting feedback of the user; and
    a means for reselecting the plurality of suitable media clips from the feedback.

8. The media system of claim 7 wherein the means for reselecting the plurality of suitable media clips operates by regenerating at least two media descriptions from the feedback, and inputting the at least two media descriptions into the goal seeking engine.

9. The media system of claim 7 further comprising a means for transmitting the feedback to a central computer.

10. The media system of claim 7 wherein the means for soliciting feedback and the means for accepting feedback are provided by a question program interface having a plurality of questions, each of the plurality of questions being associated with at least one of the plurality of media clips.

11. The media system of claim 10 wherein the means for reselecting the plurality of suitable media clips is a table in the database means that associates each of the plurality of questions with at least two desired media descriptions.

12. The media system of claim 10 wherein the means for reselecting the plurality of suitable media clips is a table in the database means that associates each of the plurality of questions with at least one of the plurality of media clips.

* * * * *